United States Patent
Lin et al.

(10) Patent No.: US 12,305,073 B2
(45) Date of Patent: May 20, 2025

(54) RESTORABLE ANTI-GLARE FILM

(71) Applicant: BenQ Materials Corporation, Taoyuan (TW)

(72) Inventors: Chih-Wei Lin, Taoyuan (TW); Tsunsheng Tao, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 573 days.

(21) Appl. No.: 17/870,758

(22) Filed: Jul. 21, 2022

(65) Prior Publication Data

US 2023/0116664 A1 Apr. 13, 2023

Related U.S. Application Data

(63) Continuation-in-part of application No. 17/496,848, filed on Oct. 8, 2021, now abandoned.

(30) Foreign Application Priority Data

Jul. 14, 2022 (TW) ................... 111126552

(51) Int. Cl.
| | | |
|---|---|---|
| C09D 5/00 | (2006.01) | |
| C09D 7/47 | (2018.01) | |
| C09D 133/10 | (2006.01) | |
| C09D 175/04 | (2006.01) | |
| C09D 183/08 | (2006.01) | |

(52) U.S. Cl.
CPC ............... *C09D 5/006* (2013.01); *C09D 7/47* (2018.01); *C09D 133/10* (2013.01); *C09D 175/04* (2013.01); *C09D 183/08* (2013.01)

(58) Field of Classification Search
CPC ........ C09D 5/006; C09D 7/47; C09D 133/10; C09D 175/04; C09D 183/08
USPC ...................................... 106/287.11
See application file for complete search history.

(56) References Cited

U.S. PATENT DOCUMENTS

2008/0023138 A1 * 1/2008 Zheng ...................... G02B 1/11
156/701

FOREIGN PATENT DOCUMENTS

| CN | 109791225 A | | 5/2019 | |
|---|---|---|---|---|
| TW | 201106004 A1 | | 2/2011 | |
| TW | I685673 B | * | 2/2020 | |
| WO | WO-2013116103 A1 | * | 8/2013 | ............... C08K 9/06 |

* cited by examiner

*Primary Examiner* — James E McDonough

(57) ABSTRACT

A restorable anti-glare film is disclosed. The restorable anti-glare film comprises a transparent substrate and a restorable anti-glare layer comprising a siloxane-containing urethane (meth)acrylate copolymer and a plurality of (meth)acrylic resin particles formed on the transparent substrate, wherein the weight average molecular weight (Mw) of the siloxane-containing urethane (meth)acrylate copolymer is between 4,000 and 60,000, and the (meth)acrylic resin particles have a 30% compressive strength of 14.7 MPa to 49 MPa and a recovery rate of more than 22%. The present restorable anti-glare film can provide a scratch-restorability and a stable and reliable anti-glare property.

10 Claims, No Drawings

RESTORABLE ANTI-GLARE FILM

CROSS-REFERENCE TO RELATED APPLICATION

This continuation-in-part patent application claims the priority benefit of U.S. utility patent application Ser. No. 17/496,848, filed on Oct. 8, 2021, and the priority benefit of TW patent application serial No. 111126552, filed on July 14, which are incorporated herein by references.

TECHNICAL FIELD

The present invention relates to an anti-glare film, and more particularly to a restorable anti-glare film with a scratch-restorability and a stable and reliable anti-glare property.

BACKGROUND OF THE INVENTION

With the increasingly development of display technology, the performance requirements of a display, such as liquid crystal displays (LCD) or organic light-emitting diode displays (OLED), such as, high contrast, wide viewing angle, high brightness, thinning, larger-sized, high-resolution and diversified additional functions are proposed.

Hand-held devices with display are now widely used, and the anti-scratch surface of the display are demanded in order to maintain the clarity and visibility of the display image. Therefore, a hard coating is generally coated on the display surface to provide hardness and lubricity to prevent the surface from being scratched.

A self-repairable lacquered coating with a rubber-like elasticity and lubricity has been proposed to coat on article surface to avoid scratches. However, abovementioned self-repairable lacquered coating is not recommended to use on a display surface due to its over-reflectivity. Although the reflectivity of the coating layer can be reduced by adding silicon dioxide particles to increase the haze, the self-repairing properties thereof will be decreased due to the addition of the particles. Therefore, the coating thickness should be increased from 15 um, which is the minimum coating thickness, to a more thickness in order to achieve an expected self-restorability.

The present invention is to provide a restorable anti-glare film with a stable and reliable anti-glare property and an excellent scratch-restorability.

SUMMARY OF THE INVENTION

An aspect of the present invention is to provide a restorable anti-glare film with a scratch-restorability and a stable and reliable anti-glare property.

The present restorable anti-glare film comprises a transparent substrate and a restorable anti-glare layer formed on the transparent substrate, wherein the restorable anti-glare layer comprises a siloxane-containing urethane (meth)acrylate copolymer and a plurality of (meth)acrylic resin particles with a 30% compression strength of 14.7 MPa to 49 MPa and a recovery rate of more than 22%.

In an embodiment of the restorable anti-glare layer of the present restorable anti-glare film, the particle size of the (meth)acrylic resin particles is in the range from 1 to 15 μm, and preferably from 2 to 12 μm; and the amount of the (meth)acrylic resin particles is in the range from 1 to 20 parts by weight per hundred parts by weight of the urethane (meth)acrylate copolymer, and preferably in the range from 1 to 18 parts by weight.

In an embodiment of the restorable anti-glare layer of the present restorable anti-glare film, the hysteresis loss of the (meth)acrylic resin particles is not more than 30%, and preferably not more than 25%.

In an embodiment of the restorable anti-glare layer of the present restorable anti-glare film, the product of the particle size of the (meth)acrylic resin particles and the use amount of the (meth)acrylic resin particles per hundred parts by weight of the urethane (meth)acrylate copolymer is in the range from 10 to 55.

In an embodiment of the restorable anti-glare film of the present invention, the thickness of the restorable anti-glare layer is in the range from 3 to 15 μm, and preferably in the range from 3 to 12 μm.

The surface roughness of the present restorable anti-glare film has an arithmetic mean deviation Ra in the range from 0.14 to 0.75 μm, a largest peak to valley height Ry in the range from 1.00 to 6.50 μm, a ten-point average roughness Rz in the range from 0.70 to 3.50 μm, and a mean spacing of local peaks S in the range from 0.050 to 0.300 μm, and a mean spacing peaks Sm in the range from 0.30 to 0.55 μm.

In an embodiment of the restorable anti-glare layer of the present restorable anti-glare film, the urethane (meth)acrylate copolymer is represented by the following formula (I) and has a weight average molecular weight (Mw) of 4,000 to

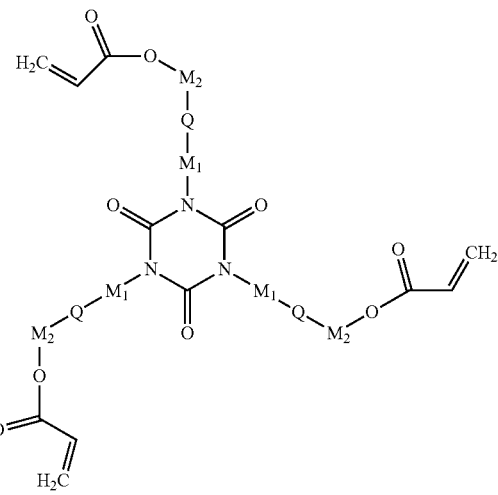

Formula (I)

wherein M1 and M2 are respectively a urethane segment, and Q is a siloxane segment as represented by the following formula (II):

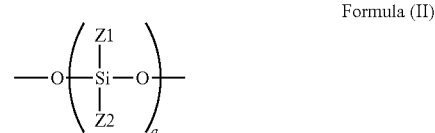

Formula (II)

wherein Z1 and Z2 are respectively a hydrogen or an alkyl group with 1 to 4 carbons, and alphabet a is an integer from 2 to 70, and the siloxane segment is present 1 to 10 weight percent relative to the total weight of the urethane (meth)acrylate copolymer.

In another embodiment of the present restorable anti-glare film, the restorable anti-glare layer can further comprise a leveling agent comprising perfluoropolyether group-containing (meth)acrylic-modified organosilicone compound.

In a preferred embodiment of the present restorable anti-glare film, the amount of the leveling agent comprising perfluoropolyether group-containing (meth)acrylic-modified organosilicone compound used in the restorable anti-glare layer is in the range from 0.3 and 1.0 parts by weight, and preferably in the range from 0.4 and 0.8 parts by weight per hundred parts by weight of the urethane (meth)acrylate copolymer.

Another aspect of the present invention is to provide a method for preparing the present restorable anti-glare film, comprising mixing a urethane (meth)acrylate copolymer and a plurality of (meth)acrylic resin particles evenly to form a restorable anti-glare coating composition; coating the restorable anti-glare coating composition on a transparent substrate and drying the coated substrate; and curing the coated substrate via radiation or electron beam to obtain a restorable anti-glare film.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate. The 30% compression strength refers to the compression strength that the (meth)acrylic resin particles are loaded when the particle diameters thereof are decreased by 30% during compression. The recovery rate refers to the rate of the particle diameter of a (meth)acrylic resin particles under a load of 9.81 mN to the particle diameter of the (meth)acrylic resin particle under a load of 1.96 mN. The hysteresis loss refers to the energy loss of the (meth)acrylic resin particles are recovered from unloading the compression strength which caused the particle deformation, it shows the recovery speed after the deformation due to loaded stress.

An aspect of the present invention is to provide a restorable anti-glare film with a scratch-restorability and a stable and reliable anti-glare property.

The present restorable anti-glare film comprises a transparent substrate and a restorable anti-glare layer formed on the transparent substrate, wherein the restorable anti-glare layer comprises a siloxane-containing urethane (meth)acrylate copolymer and a plurality of (meth)acrylic resin particles with a 30% compression strength of 14.7 MPa to 49 MPa and a recovery rate of more than 22%.

In an embodiment of the present restorable anti-glare film, the suitable transparent substrate can be the film with good mechanical strength and light transmittance. The examples of the substrate can be but not limited to polyethylene terephthalate (PET), polyethylene naphthalate (PEN), polycarbonate (PC), triacetate cellulose (TAC), polyimide (PI), polyethylene (PE), polypropylene (PP), polyvinyl alcohol (PVA), polyvinyl chloride (PVC) or cyclic olefin copolymer (COC) and the like.

In a preferred embodiment of the present anti-glare film, the light transmittance of the transparent substrate is more than 80% and preferably is more than 90%. The thickness of the transparent substrate is in the range from 15 μm to 250 μm, and preferably in the range from 20 μm to 100 μm.

In the restorable anti-glare film of the present invention, the thickness of the restorable anti-glare layer can be in the range from 3 to 15 μm, and preferably in the range from 3 to 12 μm. When the thickness of the restorable anti-glare layer is less, the scratch-restorability thereof is insufficient. When the thickness of the restorable anti-glare film is exceeded, the anti-glare property thereof is unsatisfied.

In an embodiment of the restorable anti-glare layer of the present restorable anti-glare film, the urethane (meth)acrylate copolymer is represented by the following formula (I) and has a weight average molecular weight (Mw) of 4,000 to 60,000:

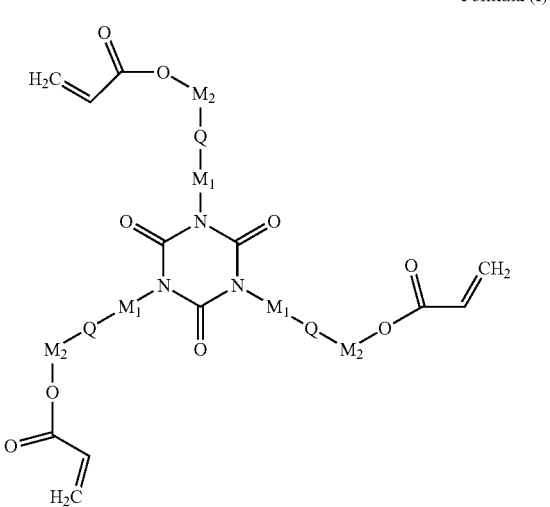

Formula (I)

wherein M1 and M2 are respectively a urethane segment, and Q is a siloxane segment represented by the following formula (II):

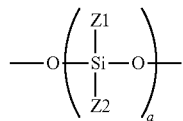

Formula (II)

wherein Z1 and Z2 are respectively a hydrogen or an alkyl group with 1 to 4 carbons, and alphabet a is an integer from 2 to 70, and the siloxane segment is present 1 to 10 weight percent relative to the total weight of the urethane (meth) acrylate copolymer.

In the preferred embodiment of the present invention, the urethane segment M1 of the urethane (meth)acrylate copolymer is derived from a multifunctional isocyanate and hydroxyl groups. The suitable multifunctional isocyanate for the urethane (meth)acrylate copolymer of the present invention is a polyisocyanate having 3 to 6 isocyanate groups, and a polyisocyanate oligomer comprising an isocyanurate ring polymerized of an aliphatic diisocyanate. The suitable aliphatic diisocyanates can be, such as, but not limited to the adduct of hexamethylene diisocyanate (HDI), HDI-isocyanurate-based polyisocyanate, the dimer of HDI, isophorone diisocyanate or combinations thereof.

In the preferred embodiment of the present restorable anti-glare film, the urethane segment M2 of the urethane (meth)acrylate copolymer is derived from polycarbonate diol and diisocyanate. The suitable diol compound used in the present urethane (meth)acrylate copolymer can be, such as, but not limited to 1,4-butanediol, 1,5-pentanediol, 1,6-hexanediol, 1,8-octanediol, 2-methyl-1,3-propanediol, 2-ethyl-1,6-hexanediol, 2,4-dimethyl-1,5-pentanediol, glycol compounds comprising alicyclic or aromatic rings, or combinations thereof. The suitable diisocyanate used in the present urethane (meth)acrylate copolymer can be, such as, but not limited to hexamethylene diisocyanate (HDI), isophorone diisocyanate (IPDI), trimethylhexamethylene diisocyanate (TMDI), dicyclohexylmethane-4,4'-diisocyanate (HMDI) or combinations thereof.

The urethane (meth)acrylate copolymer used in the present restorable anti-glare film can preferably be commercially available products, such as "AUP-727", "AUP-828", "AUP-838C", "AUP-849" or "AUP-1410" manufactured by Tokushiki Co., Ltd., Japan.

In the present restorable anti-glare film, the particle size of the (meth)acrylic resin particles used in the restorable anti-glare layer is in the range from 1 to 15 µm, and preferably in the range from 2 to 12 µm; and the use amount of the (meth)acrylic resin particles is in the range from 1 to 20 parts by weight, and preferably in the range from 1 to 18 parts by weight per hundred parts by weight of the urethane (meth)acrylate copolymer.

In the restorable anti-glare layer of the present restorable anti-glare film, the product of the particle size of the (meth)acrylic resin particles and the use amount of the (meth)acrylic resin particles per hundred parts by weight of the urethane (meth)acrylate copolymer is in the range of 10 to 55, and preferably in the range from 10 and 40. In the restorable anti-glare film of the present invention, the present restorable anti-glare film can be obtained by adjusting the particle size of the (meth)acrylic resin particles and the use amount thereof per hundred parts by weight of the urethane (meth)acrylate copolymer.

In the restorable anti-glare film of the present invention, the hysteresis loss of the (meth)acrylic resin particles in the restorable anti-glare layer is not more than 30%, and preferably not more than 25%.

In the restorable anti-glare film of the present invention, the (meth)acrylic resin particles in the restorable anti-glare layer are obtained by polymerization of 80 to 20 weight percent of crosslinkable oligomers and 20 to 80 weight percent of mono-functional (meth)acrylate monomers, wherein the crosslinkable oligomer is obtained by the reaction of a polyol, a polyisocyanate, and a hydroxyl-containing (meth)acrylate, and has an acrylic equivalent concentration of 400 and 600 g/mol. When the acrylic equivalent concentration of the crosslinkable oligomer is insufficient or excess, the flexibility of the (meth)acrylic resin particles will be unsatisfied. Moreover, the glass transition temperature (Tg) of the crosslinkable oligomer after being cured solely is in the range from 0 to 30° C., and preferably in the range from 0 to 25° C. When the Tg is lower than 0° C., the (meth) acrylic resin particles will be sticky. When the Tg is higher than 30° C., the scratch-restorability of the (meth)acrylic resin particles will be unsatisfied.

In an embodiment of the present (meth)acrylic resin particles, the suitable polyol used to prepare the crosslinkable oligomer can be, such as, but not limited to polycarbonate polyol, polyester-based polyol, polyether-based polyol, aliphatic hydrocarbon-based polyol, alicyclic hydrocarbon-based polyol or combinations thereof. The polyol preferably has 2 to 4 hydroxyl groups and has a number average molecular weight (Mn) of 200 to 3000.

In the (meth)acrylic resin particles of present restorable anti-glare film, the suitable isocyanate used to prepare the crosslinkable oligomer can be the one commonly used in the technical field and is not particularly limited to, such as aromatic polyisocyanates, aromatic aliphatic polyisocyanates, aliphatic polyisocyanates or alicyclic polyisocyanate and the likes.

In an embodiment of the (meth)acrylic resin particles of present restorable anti-glare film, the suitable hydroxyl-containing (meth)acrylate used to prepare the crosslinkable oligomer can be, such as, but not limited to 2-hydroxyethyl, 2-hydroxypropyl methacrylate, 2-hydroxypropyl acrylate, 4-hydroxybutyl acrylate, caprolactone modification-2-hydroxyethyl acrylate, polypropylene glycol monoacrylate, 2-(meth)acryloyloxyethyl-2-hydroxyethyl phthalate, pentaerythritol triacrylate or combinations thereof.

In an embodiment of the (meth)acrylic resin particles of present restorable anti-glare film, the suitable mono-functional (meth)acrylate monomer is obtained by esterification of an alcohol compound with 1 to 8 carbons, that can be, such as, but not limited to methyl (meth)acrylate, ethyl (meth)acrylate, propyl (meth)acrylate, butyl (meth)acrylate, pentyl (meth)acrylate or combinations thereof.

In the preferred embodiment of the present invention, the (meth)acrylic resin particles can further contain a structure derived from the monomers by adding the monomers during polymerization, and the monomers can be, such as 2-ethylhexyl (meth)acrylate, methyl methacrylate, styrene, acrylomorpholine, phenoxyethyl (meth)acrylate, phenoxypropyl (meth)acrylate, benzyl (meth)acrylate, polyethoxyphenyl (meth)acrylate, phenyl benzyl (meth)acrylate, o-phenylphenol (meth)acrylate, cyclohexyl (meth)acrylate, dicyclopentenyl (meth)acrylate, dicyclopentyl (meth)acrylate, ethylene glycol di(meth)acrylate, propylene glycol di(meth)acrylate, 1,4-butanediol-di(meth)acrylate, 1,6-hexanediol-di(meth)acrylate, 1,9-nonanediol-di(meth)acrylate or combinations thereof.

The (meth)acrylic resin particles used in the present restorable anti-glare film are preferably commercially available, such as TECHPOLYMER™ MB Series, MBP Series, ACP Series, or ACX Series manufactured by Sekisui Kasei Co., Ltd., Japan., such as "MB-8C", "MBP-8", "ACX-806C", "ACX-1502C", "XX-5214Z" and "XX3954Z".

In the restorable anti-glare film of the present invention, the surface roughness of the present restorable anti-glare layer has an arithmetic mean deviation Ra in the range from 0.14 to 0.75 μm, a largest peak to valley height Ry in the range from 1.00 to 6.50 μm, a ten-point average roughness Rz in the range from 0.70 to 3.50 μm, and a mean spacing of local peaks S in the range from 0.050 to 0.300 μm, and a mean spacing peaks Sm in the range from 0.30 to 0.55 μm.

When the present restorable anti-glare film is slightly damaged or scratched during use, the surface of the film can repair and restore immediately and maintain stable and excellent anti-glare properties.

In another embodiment of the present restorable anti-glare film, the restorable anti-glare layer can further comprise a leveling agent comprising perfluoropolyether group-containing (meth)acrylic-modified organosilicone compound to provide a good leveling and smoothness of the coated surface and increase the resistance of antifouling and scratch-resistance. The number average molecular weight (Mn) of the organosilicone leveling agent is in the range from 1,500 to 16,000. The suitable perfluoropolyether group-containing (meth)acrylic-modified organosilicone leveling agent can be commercially available, such as, but not limited to "X-71-1203E", "KY-1203", "KY-1211", or "KY-1207" manufactured by Shin-Etsu Chemical Co., Ltd., Japan.

In an embodiment of the present invention, the use amount of the leveling agent in the restorable anti-glare layer is in the range from 0.3 to 1.0 parts by weight, and preferably in the range from 0.4 to 0.8 parts by weight per hundred parts by weight of the urethane (meth)acrylate copolymer Another aspect of the present invention is to provide a method for preparing the present restorable anti-glare film, comprising mixing a urethane (meth)acrylate copolymer and plurality of (meth)acrylic resin particles evenly in a solvent to form a restorable anti-glare coating composition; coating the restorable anti-glare coating composition on a transparent substrate and drying the coated substrate; and curing the coated substrate via radiation or electron beam to obtain a restorable anti-glare film.

The aforementioned solvent suitable for preparation of the present restorable anti-glare film can be the organic solvents commonly used in the related art, such as ketones, aliphatic, cycloaliphatic or aromatic hydrocarbons, ethers, esters or alcohols. One or more organic solvents can be used in the restorable anti-glare coating composition. The suitable organic solvent can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol or tetrahydrofuran and the likes, but not limited thereto.

In other embodiments of the present invention, other additives such as antistatic agents, colorants, flame retardants, ultraviolet absorbers, antioxidants, surface modifiers, or leveling agent or defoaming agent without polyether modification can be added to the aforementioned restorable anti-glare coating composition as required.

The above-mentioned restorable anti-glare coating composition can be applied to the substrate surface by method known in the related art, such as, bar coating, blade coating, dip coating, roll coating, spinning coating, slot-die coating and the like.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

EXAMPLE

Example 1: Preparation of a Restorable Anti-Glare Film 9 parts by weight of the urethane (meth)acrylate copolymer (AUP-828, available from Tokushiki Co., Ltd., Japan), 1 part by weight of the (meth)acrylic resin particles with a particle size of 3 μm (XX-5214Z, available from Sekisui Plastics Co., Ltd., Japan) and 20 parts by weight of methyl isobutyl ketone (MIBK) were mixed for 1 hour to form a restorable anti-glare coating composition. The prepared restorable anti-glare coating composition was coated on a surface of a polyethylene terephthalate (PET) substrate of 80 μm, and then the restorable anti-glare coating composition was dried at 80° C. and cured by exposing to UV light in a cumulative dosage of 350 mJ/cm$^2$ under nitrogen atmosphere. Thus, a restorable anti-glare film comprising a PET substrate and a restorable anti-glare layer of 9.3 μm formed thereon was obtained.

The properties of the obtained restorable anti-glare film were determined in accordance with the measurement described hereinafter. The test results of light transmittance, haze, anti-glare evaluation, scratch-restorability and surface roughness were shown in Table 1 and Table 2.

Example 2: Preparation of a Restorable Anti-Glare Film 5.6 parts by weight of the urethane (meth)acrylate copolymer (AUP-828, available from Tokushiki Co., Ltd., Japan), 0.99 parts by weight of the (meth)acrylic resin particles with a particle size of 3 μm (XX-5214Z, available from Sekisui Plastics Co., Ltd., Japan) and 13.32 parts by weight of methyl isobutyl ketone (MIBK) were mixed for 1 hour to form a restorable anti-glare coating composition. The prepared restorable anti-glare coating composition was coated on a surface of a polyethylene terephthalate (PET) substrate of 80 μm, and then the restorable anti-glare coating composition was dried with 80° C. and cured by exposing to UV light in a cumulative dosage of 350 mJ/cm$^2$ under nitrogen atmosphere. Thus, a restorable anti-glare film comprising a PET substrate and a restorable anti-glare layer of 7.3 μm formed thereon was obtained.

The properties of the obtained restorable anti-glare film were determined in accordance with the measurement described hereinafter. The test results of light transmittance, haze, anti-glare evaluation, scratch-restorability and surface roughness were shown in Table 1 and Table 2.

Example 3: Preparation of a Restorable Anti-Glare Film 5.6 parts by weight of the urethane (meth)acrylate copolymer (AUP-828, available from Tokushiki Co., Ltd., Japan), 0.06 part by weight of the (meth)acrylic resin particles with a particle size of 10 μm (XX-3954Z, available from Sekisui Plastics Co., Ltd., Japan) and 11.4 parts by weight of methyl isobutyl ketone (MIBK) were mixed for 1 hour to form a restorable anti-glare coating composition. The prepared restorable anti-glare coating composition was coated on a surface of a polyethylene terephthalate (PET) substrate of 80 μm, and then the restorable anti-glare coating composition was dried at 80° C. and cured by exposing to UV light in a cumulative dosage of 350 mJ/cm$^2$ under nitrogen atmosphere. Thus, a restorable anti-glare film comprising a PET substrate and a restorable anti-glare layer of 9.4 μm formed thereon was obtained.

The properties of the obtained restorable anti-glare film were determined in accordance with the measurement described hereinafter. The test results of light transmittance, haze, anti-glare evaluation, scratch-restorability and surface roughness were shown in Table 1 and Table 2.

Example 4: Preparation of a Restorable Anti-Glare Film 5.6 parts by weight of the urethane (meth)acrylate copolymer (AUP-828, available from Tokushiki Co., Ltd., Japan), 0.18 part by weight of the (meth)acrylic resin particles with a particle size of 10 μm (XX-3954Z, available from Sekisui Plastics Co., Ltd., Japan) and 11.65 parts by weight of methyl isobutyl ketone (MIBK) were mixed for 1 hour to form a restorable anti-glare coating composition. The prepared restorable anti-glare coating composition was coated on a surface of a polyethylene terephthalate (PET) substrate of 80 μm, and then the restorable anti-glare coating composition was dried at 80° C. and cured by exposing to UV light in a cumulative dosage of 350 mJ/cm$^2$ under nitrogen atmosphere. Thus, a restorable anti-glare film comprising a PET substrate and a restorable anti-glare layer of 8.0 μm formed thereon was obtained.

The properties of the obtained restorable anti-glare film were determined in accordance with the measurement described hereinafter. The test results of light transmittance, haze, anti-glare evaluation, scratch-restorability and surface roughness were shown in Table 1 and Table 2.

Example 5: Preparation of a Restorable Anti-Glare Film 9 parts by weight of the urethane (meth)acrylate copolymer (AUP-828, available from Tokushiki Co., Ltd., Japan), 1 part by weight of the (meth)acrylic resin particles with a particle size of 3 μm (XX-5214Z, available from Sekisui Plastics Co., Ltd., Japan), 0.013 parts by weight of the organosilicon compound modified with (meth)acrylic acid with perfluoropolyether functional group (KY-1203E, available from Shin-Etsu Chemical Co., Ltd., Japan) and 20 parts by weight of methyl isobutyl ketone (MIBK) were mixed for 1 hour to form a restorable anti-glare coating composition. The prepared restorable anti-glare coating composition was coated on a surface of a polyethylene terephthalate (PET) substrate of 80 μm, and then the restorable anti-glare coating composition was dried at 80° C. and cured by exposing to UV light in a cumulative dosage of 350 mJ/cm$^2$ under nitrogen atmosphere. Thus, a restorable anti-glare film comprising a PET substrate and a restorable anti-glare layer of 7.5 μm formed thereon was obtained.

The properties of the obtained restorable anti-glare film were determined in accordance with the measurement described hereinafter. The test results of light transmittance, haze, anti-glare evaluation, restorability and surface roughness were shown in Table 1 and Table 2.

Optical Properties Measurement

The optical properties of the restorable anti-glare film obtained from the Examples were measured according to Japanese Industrial Standard (JIS) test methods.

Light transmittance measurement: The light transmittance was measured according to the test method of JIS K7361 by NDH-2000 Haze Meter (manufactured by Nippon Denshoku Industries, Japan).

Haze measurement: The haze was measured according to the test method of JIS K7136 by NDH-2000 Haze Meter.

Anti-glare evaluation: The restorable anti-glare films were adhered to a black acrylic plate, and the surfaces of the prepared samples were illuminated by 2 fluorescent tubes to check the status of reflected by visual observation. The evaluation criteria were as below.

X: Two separate fluorescent tubes could be seen clearly and the straight outlines of tubes was distinguished obviously;

O: It could not be seen that there are 2 fluorescent tubes and the shapes of tubes could not be distinguished.

Surface Roughness Measurement

Surface roughness measurement: The mean spacing between peaks Sm, arithmetic mean deviation Ra and largest peak to valley height Ry of surface roughness of the restorable anti-glare film was measured according to the test method of JIS B 0601-1994 by MITUTOYO Formtracer CS-5000 Hybrid Surface Contour Measuring Machine.

Scratch-Restorability and Abrasion Resistance Test

Scratch-restorability test: The surfaces of the restorable anti-glare films were rubbed back and forth by brass brush with a load of 100 gf/cm$^2$ for 10 times in 20 seconds, and checked if scratches on the surface disappear after 5 minutes.

O: No scratches were found on the surface;

X: Scratches were found on the surface.

Abrasion resistance test: The surfaces of the restorable anti-glare films were rubbed back and forth by steel wood #0000 with a load of 200 g/cm$^2$ for 10 times at a speed of 60 rpm, and checked if scratches were made on the film surface by visual observation.

O: No scratches were found on the surface;

X: Scratches were found on the surface.

TABLE 1

The optical test results of the restorable anti-glare films obtained from Examples 1 to 5

| Examples | Patical size (μm) | The use amount of the particals (weight parts) [1] | The product of the of the particle size and the use amount of the particles [2] | Light transmittance (%) | Haze (%) | Anti-glare evaluation | Scratch-restorability | Abrasion Resistance |
|---|---|---|---|---|---|---|---|---|
| Example 1 | 3 | 11.1 | 33.3 | 92.25 | 8.76 | ○ | ○ | — |
| Example 2 | 3 | 17.6 | 52.8 | 92 | 10.34 | ○ | ○ | — |
| Example 3 | 10 | 1.0 | 10 | 91.6 | 5.33 | ○ | ○ | — |
| Example 4 | 10 | 3.2 | 32 | 91.14 | 8.18 | ○ | ○ | — |
| Example 5 | 3 | 11.1 | 33.3 | 92.1 | 8.03 | ○ | ○ | ○ |

[1] "The use amount of the particles" refers to the use amount of the (meth)acrylic resin particles per hundred parts by weight of the urethane (meth)acrylate copolymer.
[2] "The product of the of the particle size and the use amount of the particles" refers to the product of the particle size of the (meth)acrylic resin particles and the use amount of the (meth)acrylic resin particles per hundred parts by weight of the urethane (meth)acrylate copolymer.

TABLE 2

The test results of the surface roughness of the restorable anti-glare film obtained from Examples 1 to 5

| | Surface roughness | | | | |
|---|---|---|---|---|---|
| Examples | Arithmetic mean deviation Ra (μm) | Largest peak to valley height Ry (μm) | Ten-point average roughness Rz (μm) | Mean spacing of local peaks S (μm) | The mean spacing between peaks Sm (μm) |
| Example 1 | 0.151 | 1.076 | 0.716 | 0.062 | 0.411 |
| Example 2 | 0.295 | 2.255 | 1.427 | 0.178 | 0.431 |
| Example 3 | 0.655 | 4.247 | 2.724 | 0.247 | 0.476 |
| Example 4 | 0.688 | 5.695 | 3.325 | 0.256 | 0.481 |
| Example 5 | 0.350 | 2.478 | 1.491 | 0.181 | 0.532 |

As shown in Table 1 and Table 2, the restorable anti-glare films obtained from Examples 1 to 5 provide good light transmittance, haze and anti-glare property, and excellent scratch-restorability. At the same time, the restorable anti-glare film has a fine surface, with an arithmetic mean deviation Ra of 0.151 to 0.688 μm, a largest peak to valley height Ry of 1.076 to 5.695 μm, a ten-point average roughness Rz of 0.716 to 3.325 μm, a mean spacing of local peaks S of 0.062 and 0.256 μm, and a mean spacing between peaks Sm of 0.411 and 0.532 μm. In addition, the restorable anti-glare film obtained from Example 5 comprising a leveling agent comprising perfluoropolyether group-containing (meth)acrylic-modified organosilicone compound can provide excellent abrasion resistance with satisfied light transmittance, haze and anti-glare property.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A restorable anti-glare film, comprising:
a transparent substrate; and
a restorable anti-glare layer formed on the transparent substrate, wherein the restorable anti-glare comprising:
a siloxane-containing urethane (meth)acrylate copolymer; and
a plurality of (meth)acrylic resin particles with a 30% compression strength of 14.7 MPa to 49 MPa and a recovery rate of more than 22%.

2. The restorable anti-glare film as claimed in claim 1, wherein the particle size of the (meth)acrylic resin particles is in the range from 1 to 15 μm, and the use amount of the (meth)acrylic resin particles is in the range from 1 to 20 parts by weight per hundred parts by weight of the urethane (meth)acrylate copolymer.

3. The restorable anti-glare film as claimed in claim 2, wherein the particle size of the (meth)acrylic resin particles is in the range from 2 to 12 μm, and the use amount of the (meth)acrylic resin particles is in the range from 1 to 18 parts by weight per hundred parts by weight of the urethane (meth)acrylate copolymer.

4. The restorable anti-glare film as claimed in claim 1, wherein the product of the particle size of the (meth)acrylic resin particles and the use amount of the (meth)acrylic resin particles to per hundred parts by weight of the urethane (meth)acrylate copolymer is in the range from 10 to 55.

5. The restorable anti-glare film as claimed in claim 1, wherein the thickness of the restorable anti-glare layer is in the range from 3 to 15 μm.

6. The restorable anti-glare film as claimed in claim 1, wherein the surface roughness of the restorable anti-glare film has an arithmetic mean deviation Ra in the range from 0.14 to 0.75 μm, a largest peak to valley height Ry in the range from 1.00 to 6.50 μm, a ten-point average roughness Rz in the range from 0.70 to 3.50 μm, and a mean spacing of local peaks S in the range from 0.050 to 0.300 μm, and a mean spacing peaks Sm in the range from 0.30 to 0.55 μm.

7. The restorable anti-glare film as claimed in claim 1, wherein the urethane (meth)acrylate copolymer is represented by the following formula (I) and has a weight average molecular weight (Mw) of 4,000 to 60,000:

Formula (I)

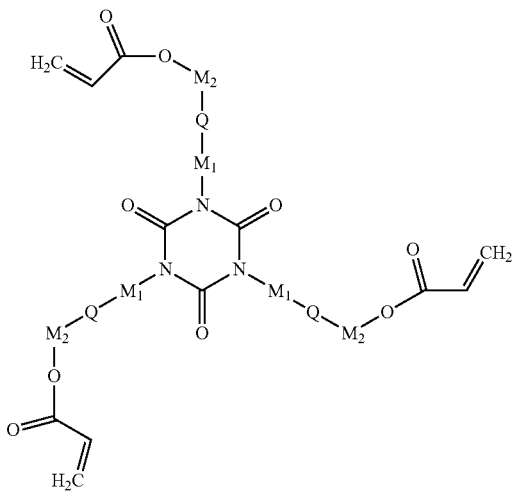

wherein M1 and M2 are respectively a urethane segment, and Q is a siloxane segment as represented by the following formula (II):

Formula (II)

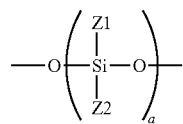

wherein Z1 and Z2 are respectively a hydrogen or an alkyl group with 1 to 4 carbons, and alphabet a is an integer from 2 to 70, and the siloxane segment is present 1 to 10 weight percent to the total weight of the urethane (meth)acrylate copolymer.

8. The restorable anti-glare film as claimed in claim 1, wherein the hysteresis loss of the (meth)acrylic resin particles is not more than 30%.

9. The restorable anti-glare film as claimed in claim 1, wherein the restorable anti-glare layer further comprises a leveling agent comprising perfluoropolyether group-containing (meth)acrylic-modified organosilicone compound.

10. The restorable anti-glare film as claimed in claim 9, wherein the use amount of the leveling agent comprising perfluoropolyether group-containing (meth)acrylic-modified organosilicone compound is in the range from 0.3 to 1.0 parts by weight per hundred parts by weight of the urethane (meth)acrylate copolymer.

\* \* \* \* \*